(12) United States Patent
Webster et al.

(10) Patent No.: US 8,490,542 B2
(45) Date of Patent: Jul. 23, 2013

(54) AUTOMATIC SINGLE CUP BREWING VENDER

(75) Inventors: Joseph P. Webster, St. Charles, MO (US); Billy J. Castleberry, Lubbock, TX (US); David L. Brandsma, St. Charles, MO (US)

(73) Assignee: Newco Enterprises, Inc., St. Charles, MO (US)

( * ) Notice: Subject to any disclaimer, the term of this patent is extended or adjusted under 35 U.S.C. 154(b) by 1445 days.

(21) Appl. No.: 12/152,325

(22) Filed: May 14, 2008

(65) Prior Publication Data

US 2009/0101020 A1    Apr. 23, 2009

Related U.S. Application Data

(60) Provisional application No. 60/930,459, filed on May 16, 2007.

(51) Int. Cl.
*A47J 31/40* (2006.01)

(52) U.S. Cl.
USPC ........................................... 99/289 R (58) Field of Classification Search
USPC ........................................... 99/289
See application file for complete search history.

(56) References Cited

U.S. PATENT DOCUMENTS

| | | |
|---|---|---|
| 2,678,000 A | 5/1954 | Scheidt et al. |
| 3,154,418 A | 10/1964 | Lovell et al. |
| 3,260,190 A | 7/1966 | Levinson |
| 3,342,518 A | 9/1967 | Gorton |
| 3,354,812 A | 11/1967 | Gorton |
| 3,755,895 A | 9/1973 | Claasen |
| 4,338,338 A | 7/1982 | Popkes |
| 4,465,697 A | 8/1984 | Brice et al. |
| 4,584,101 A | 4/1986 | Kataoka |
| D291,866 S | 9/1987 | Brice |
| 4,699,794 A | 10/1987 | Brice et al. |
| 4,829,888 A | 5/1989 | Webster et al. |
| 5,135,762 A | 8/1992 | Vernon et al. |
| 2,308,241 A | 1/1993 | Hogaboom, Jr. |
| 5,277,103 A | 1/1994 | Cox |
| 5,478,581 A | 12/1995 | Christie et al. |
| D366,188 S | 1/1996 | Norenberg |
| 5,776,527 A | 7/1998 | Blanc |
| 6,044,754 A | 4/2000 | Fuentes |
| 6,345,570 B1 | 2/2002 | Santi |
| 6,354,190 B1 | 3/2002 | Haydon |
| D485,122 S | 1/2004 | Multari |
| D502,053 S | 2/2005 | Bodum |
| D523,691 S | 6/2006 | Greenwood, III et al. |
| 7,210,401 B1 * | 5/2007 | Rolfes et ..................... 99/289 R |

* cited by examiner

*Primary Examiner* — Kurt Fernstrom
*Assistant Examiner* — Dolores Collins
(74) *Attorney, Agent, or Firm* — Paul M. Denk (57) ABSTRACT

A single serving beverage vender incorporates a device for automatically brewing and dispensing single cups of coffee or other beverage through a controlled vending machine. The vender includes a flipper assembly, for an individual packet of grounds, and can process that packet through various sequences including presenting a support from within an enclosure, in preparation for drip brewing of a beverage, brewing a cup or a mug of beverage from the grounds packet, then disposing of the packet, and providing access to the flipper assembly, following the brewing of a cup of beverage for consumption.

14 Claims, 11 Drawing Sheets

AUTOMATIC SINGLE CUP BREWING VENDER

CROSS REFERENCE

This application is a non-provisional patent application which claims priority to the provisional application having Ser. No. 60/930,459 filed on May 16, 2007, and which claims priority to the regular letters patent application having Ser. No. 10/917,501 filed on Aug. 12, 2004, and which claims priority to the provisional patent application having Ser. No. 60/495,761 filed on Aug. 15, 2003.

BACKGROUND OF THE INVENTION

This invention relates to a device for automatically brewing and dispensing single cup quantities of coffee through a vending machine.

Existing automatic coffee vending machines generally brew a quantity of coffee that is retained in a reservoir in the machine and dispensed when a user inserts coins or credit into the machine. These existing systems suffer the disadvantages of having to keep heated a reservoir of coffee for an indeterminate time, and the coffee thus dispensed has a tendency to become stale and may be subject to overheating. Generally speaking, such coffee is not as palatable or enjoyable for the user as a cup of freshly brewed coffee. Current coffee drinkers seek fresh and flavorful coffees. Also, such machines have very limited flexibility in the choice of coffee provided. In recent years, a number of flavored and gourmet coffees have become available which are highly desirable to regular coffee drinkers. Because such choices follow individual taste, existing coffee vending machines have a difficult time providing such custom services and coffee blends.

SUMMARY OF THE INVENTION

The present invention seeks to overcome these difficulties by providing a coffee vending machine which brews a single cup of coffee and requires only that the user insert a prepackaged coffee packet. To use the present invention, a user acquires (either through an associated vending machine or through other commercial channels) a prepackaged packet of coffee grounds sufficient for a single cup of coffee. Because the user provides this packet of coffee, the user may choose a desirable coffee type or flavor. The packet generally consists of a quantity of coffee grounds contained in a jacket made from a fibrous, or paper material, which allows the passage of water while retaining the coffee/tea grounds. The jacket material is substantially identical to the types of materials used to make coffee filters in traditional coffee brewing machines. Though coffee is referred to throughout this specification, other beverages made by brewing or mixing are foreseen for this invention.

Having acquired a coffee packet, the user then places it on a tray assembly, which is actuated to extend and retract from the front of the invention, and places a cup, or mug, underneath a dispensing nozzle similar to that in traditional coffee vending machines. The tray assembly includes a frame, a tray hinge on one side of the frame, a lid hinged at the rear of the frame, and a shaft with gears connected to a torsion spring connected to the lid. Upon activating the invention (by inserting coins combined with pressing an activating button or lever, or in the case of machines intended for free operation merely pressing a button), the tray assembly is pushed by the user into the machine, and the lid closes over the coffee packet as the tray assembly locks into place. The brewing process then begins, with hot water being passed through the coffee packet and through the dispensing nozzle into the user's cup or mug. By this process, the user is provided with a single cup of the coffee of his choice.

At the end of the brewing cycle, compressed air drives out the last of the coffee in the machine and dries the apparatus in order to prepare it for the next user of the machine. Then the shaft rotates, turning both a right angle gear connected to the lid of the tray assembly as well as a gear connected to a torsion spring which is also connected to the hinged base, or tray, of the tray assembly. By this action, the lid is raised, and the tension in the torsion spring created by rotation of the shaft and gear causes the hinged base, or tray, to flip upwards, dislodging the spent coffee packet from the machine. This packet may then drop either internally into a waste coffee packet bin or may be directed out of the machine to fall into a waste basket. The hinged base, or tray, then rotates back into its horizontal position.

It is the principal object of this invention to provide for an automatic single cup brewing vender.

Another object of this invention is to provide a holder that incorporates automatic means for processing the insertion, drip brewing, and dispensing of the grounds packet, all through a programmed control.

Still another object of this invention is to provide for the automatic regulation of the beverage brewer, and its grounds holder, which may be manipulated into opening or closure, for brewing a beverage.

These and other objects may become more apparent to those skilled in the art upon review of the invention as described herein.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
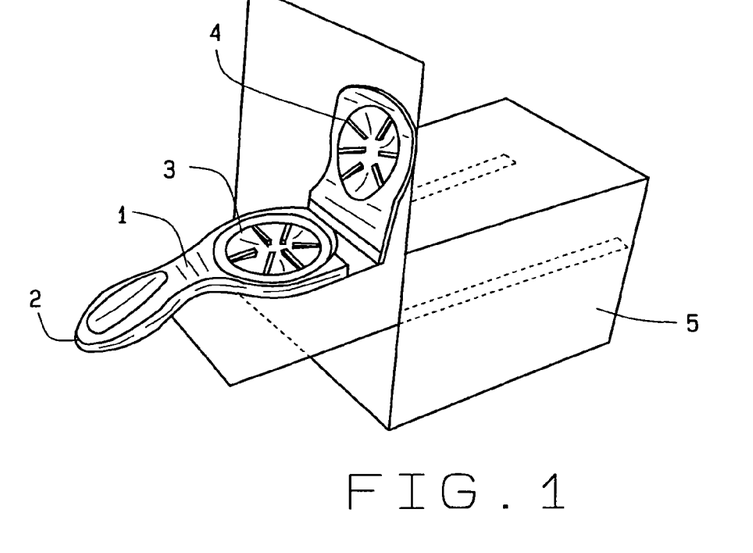
FIG. 1 is a perspective view of an alternate embodiment of the tray assembly in a box representing a coffee vending machine, showing the tray ejected from the machine.

In describing the subject matter of this invention, and in referring to FIG. 1, the tray assembly 1 of an alternate embodiment is shown, and is normally comprised of a holder, having a handle 2, that facilitates its maneuvering, and incorporates a base 3, formed as a tray, and incorporates a pivotal upper half of the tray, at 4, which may be opened, to provide for the locating of a packet of ground coffee, not shown, onto the base 3, before the upper half or lid 4 is closed.

Figure 2:
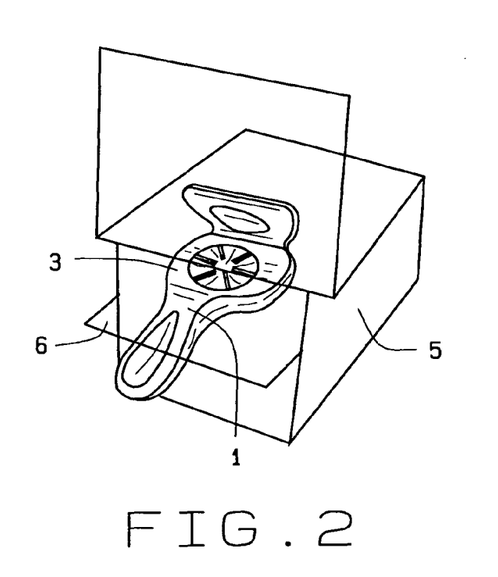
FIG. 2 is a perspective view of an alternate embodiment of the tray assembly in a box representing a coffee vending machine, showing the tray as it is being inserted into the machine with the lid lowering into place.
Figure 3:
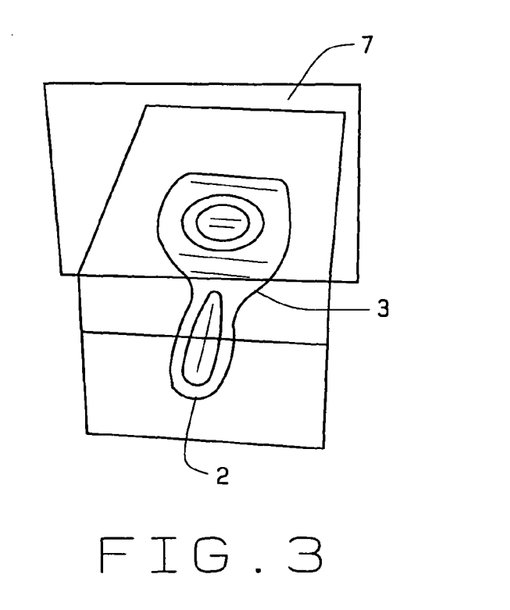
FIG. 3 is a front view an alternate embodiment of the tray assembly in a box representing a coffee vending machine, showing the tray assembly fully inserted with lid closed.

The casing, shown at 5, is representative of a beverage brewing machine, and has a support 6 that may be manually or mechanically shifted forwardly, in the manner as shown in FIG. 2, so that the holder 1 can be opened, to allow for the locating of an individual coffee or tea packet therein, the lid 4 closed, and then the entire support 6 be moved back interiorly of the vending machine 5, to provide for brewing of an individual cup of the beverage, whether it be coffee, tea, or whatever is selected in all its variations by the purchaser.

FIG. 2 shows how the holder 1 upon its tray or support 6 is being shifted into the vending machine 5, and then once located therein, a front gate 7 is lowered, into closure, for containing the entire brew assembly within the vending machine, for further processing.

The application of heated water to the brew basket or holder can be accomplished in the usual mechanical fashion as generally described in a co-pending patent application owned by the same Assignee herein, as set forth in U.S. patent application Ser. No. 10/917,501.

Figure 4:
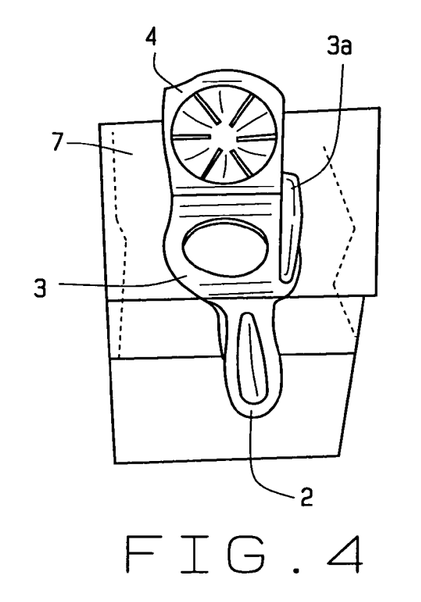
FIG. 4 is a front view an alternate embodiment of the tray assembly in a box representing a coffee vending machine, showing the lid opened and the hinged base flipped to the side after actuation of the shaft, gear, and torsion spring assembly.
Figure 5:
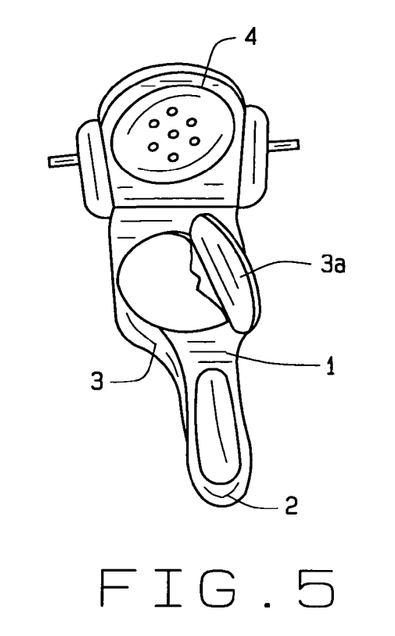
FIG. 5 is a front view of an alternate embodiment of the tray assembly, showing the lid opened and the hinged base partially flipped to the side.
Figure 6:
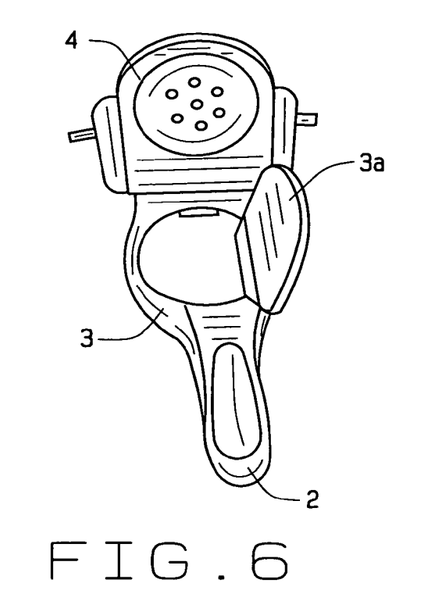
FIG. 6 is a front view of an alternate embodiment of the tray assembly, showing the lid opened and the hinged base fully flipped to the side.

When a brewing cycle has been completed, as can be seen in FIGS. 4-6, the tray or base 3 is mechanically pivoted, automatically, upwardly, and to the side, where the now spent packet of grounds is dispensed, and will drop through a window, not shown, to another location for disposal. Following this, the base or tray 3 will then re-pivot by its torsion spring back into its usable position, as shown in FIG. 1, at which time the lid or cover 7 for the brewer, or dispenser, is automatically opened, and the holder 1 can be removed for cleaning, in preparation for the next usage.

Figure 7:
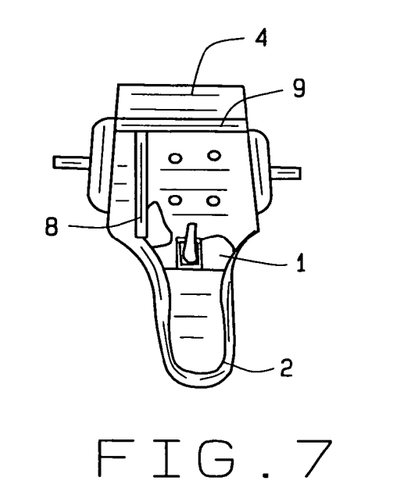
FIG. 7 is a bottom view of an alternate embodiment of the tray assembly, showing the underside and the shaft, gears, and torsion spring.

The various mechanical features that automatically provide for operations of this alternate embodiment of the holder, within its brewer, can be seen in FIG. 7. These include a shaft 8, which incorporates a spring means, and which when actuated by a motor provides for that pivotal movement to the base 3, to the side, for dispensing of its used packet. Then, there is also included a further shaft 9 which provides for the pivotal opening of the lid 4, when it is desired to insert, or remove, a grounds packet from therein, during usage of the holder. Also, the front cover 7 for the dispenser may also be mechanically actuated, within the cycle of the timed brewing operation, to allow for raising or lowering of the dispenser door, during usage and application.

Figure 8:
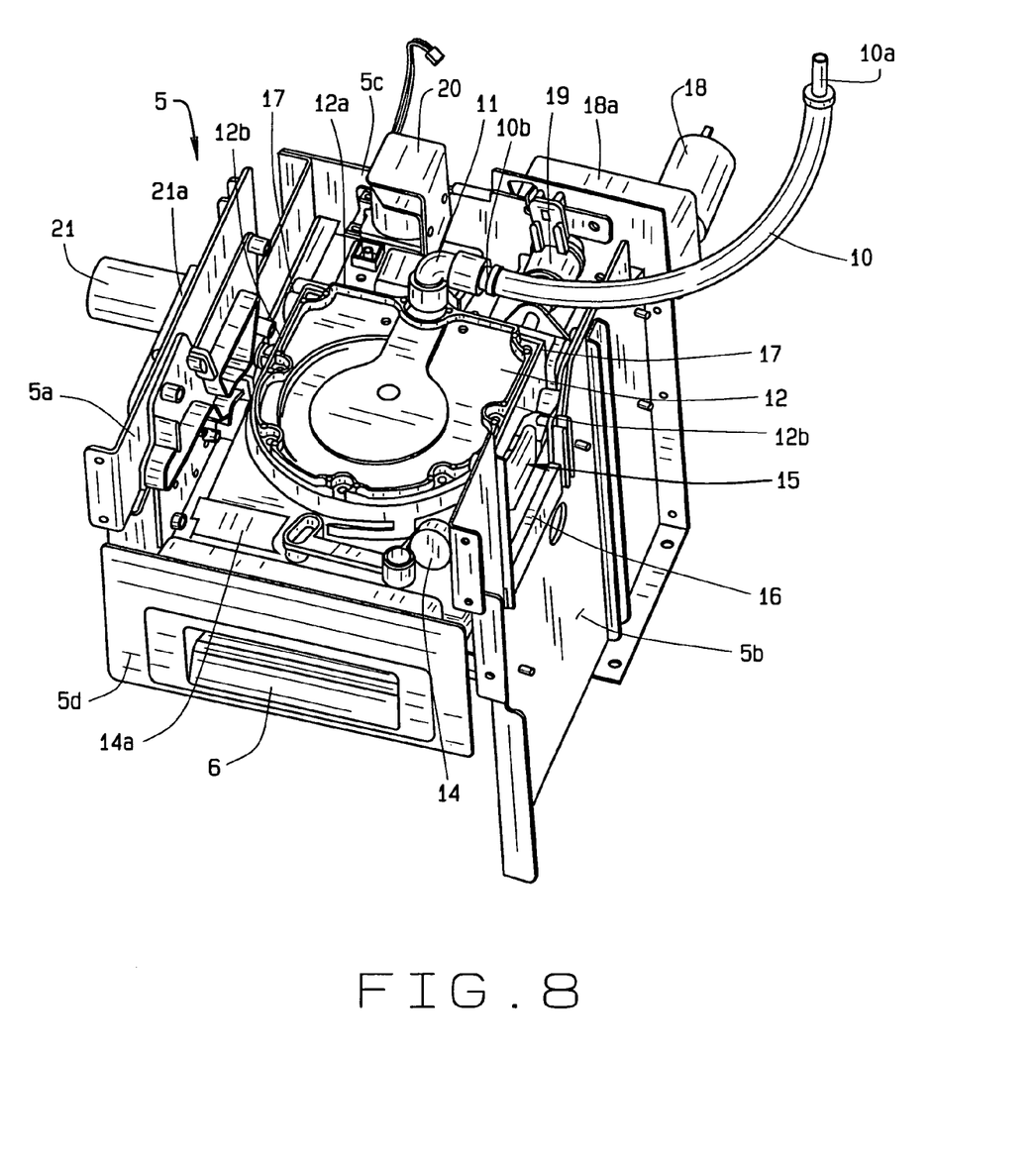
FIG. 8 is an isometric view of the preferred embodiment of the brewing machine of the present invention.

FIG. 8 then shows the preferred embodiment of the vending machinery receiving the present invention. The present invention is contained within a generally rectangular casing 5 here shown in isometric view and revealing the top and internal components of the machinery. The casing has a left side 5a generally upright, and an opposite right side 5b, also upright, and rear 5c locating perpendicular to the left side and the right side and an opposite face plate 5d. The left side and the right side are mutually parallel and spaced apart as are the rear and the face plate. The face plate has a centered handgrip as at 6 that allows a user to pull out the tray of the invention for loading a packet of beverage grounds and to push in the tray for brewing of the beverage. Within the casing, an inflow line 10 delivers heated water, hot water, steam, or compressed air as selected by the user or onboard brewing program through circuitry shown later in FIG. 12. The inflow line has a flexible, tubular material and a generally arcuate shape allowing for flexibility during operation of the machinery as described generally in FIGS. 4-7. The inflow line has an inlet 10a that connects above the casing 5 to the fluid supply of the vending machine and an opposite outlet 10b that connects to an elbow 11.

The elbow delivers the heated water, hot water, steam, or compressed air, into the brewing portion of the machinery. The elbow connects with the center rear of the lid or cover 12. The cover has a generally planar form with a rear edge 12a, two sides 12b extending perpendicular to the ends of the rear, and a curved front edge 12c extending from the ends of the sides opposite the rear edge. The front edge is generally semicircular. In a further alternate embodiment, the cover remains secured in a downward position using a latch generally centered upon the front edge. The latch has a hinged connection to the cover and a free end that engages a lower portion of the machinery. In the preferred embodiment, rightwards from the center of the front edge 12c in this figure, a locking cam, as shown at 14, temporarily secures the cover in the down position as during brewing. The locking cam locates generally behind one end of the faceplate towards the right side of the invention. Opposite the locking cam, the invention has a planar latch release as at 14a generally behind the other end of the faceplate towards the left side of the invention. The latch release cooperates with the locking cam in securing the cover downwardly. Then where the front edge 12c joins the side 12b rightwards of the cam 14, a counterweight 15 extends generally parallel to the side. The counterweight has space below it to accommodate its rotation through approximately ninety degrees. Outwardly from the counterweight, the casing 5b has a window 16 that allows entry of a spent package of beverage grounds into another compartment of the machine. The other compartment leads to an opening in the front of the machine for a user to grasp the spent package and dispose of it.

As described above, the preferred embodiment moves a beverage packet upon two axes during and after brewing. Upon each end of the rear edge 12a, the cover 12 connects to a hinge 17. The hinges are located inwardly from the face plate and allow the cover to rotate upwardly and downwardly upon an axis parallel to the diameter of the front edge 12c of the cover. The rotation axis is also parallel to the place of the face plate. In use, the cover tilts upwardly upon the hinges, opening the machine to receive a brew packet then the cover closes upon the brew packet in a hermetic seal.

Towards one hinge 17 locating towards the window 16, the machine has a first motor 18 proximate the joint of the side and the rear of the casing. The motor provides rotation and torque through gearing 18a to a coupling 19. The coupling transmits the rotation and torque to the lower portions of the cover. This rotation flips the lower portion of the cover to eject a spent brew packet into the window, generally about an axis parallel to the side 5b having the window. Upon the rear 5c of the casing towards the center and away from the first motor 18, a magnetic sensor 20 secures to the rear. The magnetic sensor detects when the tray and related components are located inwardly and upon the rear of the casing 5c in a home position. In this position, the coupling has the splines engaged, as later described, and more importantly a beverage packet inserted within the cover and the flipper assembly for brewing. The magnetic sensors closes when a beverage packet is located within the cover and flipper assembly and the tray is rearward. Closing of the magnetic sensor allows brewing to proceed. Following ejection of the spend beverage packet, the magnetic sensor opens and allows a user to pull the tray outwardly for the next cycle of brewing.

Outwardly from the side 5b opposite the window 16 and near the other hinge 17, the present invention has an alternate embodiment including a second motor 21. The second motor engages the tray through gearing 21a and supplies rotation and torque about an axis parallel to the rear edge 12a for extending and retracting the tray thus opening and closing the cover.

Figure 8A:
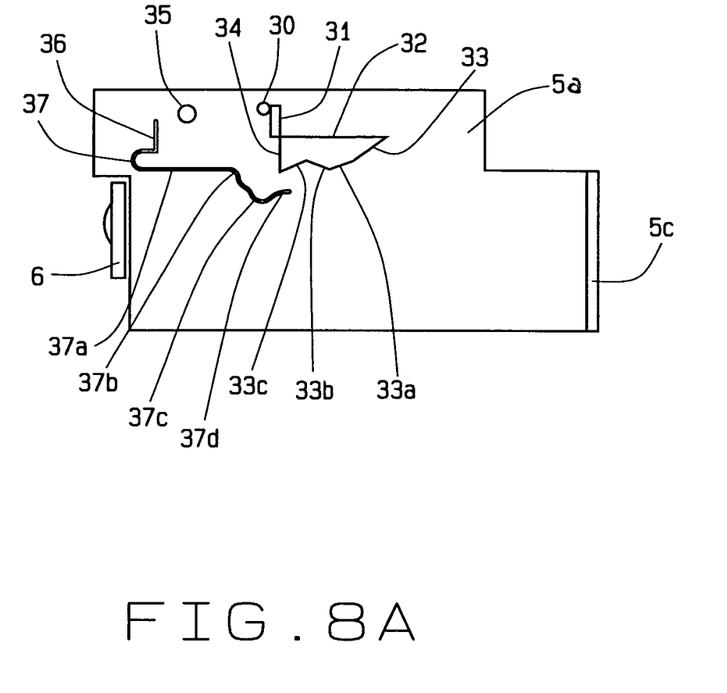
FIG. 8A is a side view of the left side panel, as at 5a, of the casing showing the interior and related tracks.

As the mechanical action of pulling and pushing the tray and related components using the handgrip 6 raises and lowers the cover to load a beverage packet, FIG. 8a describes the mechanisms that guide the raising and lowering of the cover. FIG. 8a shows the left side 5a of the casing from the interior of the invention. The figure shows the handgrip 6 upon the left and the rear 5c of the casing towards the right. As later shown, the cover has pins at the hinge and ahead of the hinge in the direction of the handgrip. The pins follow two tracks that guide the raising and lowering of the cover during usage. One track begins with a pivot as at 30 that supports one end of a paddle switch 31. The paddle switch rotates towards the handgrip and allows a pin to pass when proceeding outward. The paddle switch stops when a pin impacts it when the cover moves rearward. Behind the paddle switch, a flat section 32 of track allows for smooth passage of the pin when transiting from the rear towards the front of the invention. The pivot 30, paddle switch 31, and flat section 32 extend inwardly from the left side 5a, generally perpendicular to the plane of the left side.

The flat section 32 provides the top edge of the rear track 33. The rear track and its components also extend perpendicular to the left side. The rear track descends at a slope from the rear most end of the flat section downwardly at an angle of approximately forty five degrees for about one third of the length of the flat section. The rear track 33 then flattens its angle of descent in its first subsection 33a. The first subsection continues towards the handgrip to about the midpoint of the flat section. Then the second subsection 33b has an upward angle of ascent generally mirroring the first subsection. With approximately one quarter of the flat track length remaining, the third subsection 33c extends downwardly at a slightly steeper angle than the first subsection 33a. The third subsection continues to the approximate vicinity of the end of the flat section at the paddle switch. The third subsection joins with the fourth subsection 34 that extends generally collinear with the paddle switch 31 and approaches the flat section from below generally perpendicularly. The flat track and the subsections of the rear track extend inward from the left side for approximately the height of the pins as later shown. The flat track and the subsections of the rear track have sufficient thickness to resist impact loads from the pins and they travel upon the various tracks during operations of the invention.

Ahead of the rear track 33, the left side has the front track that begins with a nearly vertical stop 36. The stop extends inwardly from the left side 5a in a generally vertical manner slightly behind the handgrip 6. Behind the stop, the left side has a knob as at 35 where the gap between the knob and the stop allows a pin to pass downwardly as when the cover begins to close upon the flipper support following loading of a beverage packet into the flipper support and the user pushing the tray inwardly. The stop has a free end locating upwardly from the handgrip. Opposite the free end, the stop joins to the forward loop, as at 37, of the front track. The forward loop provides a section of track that extends from the stop towards the handgrip and then retreats toward the inside of the left side away from the handgrip. The forward loop has a partially elliptical form that has a flat bottom track 37a that extends from proximate the handgrip rearwardly. The bottom track extends generally flat, past the knob 35 and short of the pivot 30. The front track then curves downwardly from the bottom track 37a into the race as at 37b. The race is generally linear and slightly spaced rearward from vertical. The race transitions a pin from horizontal movement to vertical movement generally as the cover begins to lower. The race then joins with the curve 37c in the front track. The curve is generally concave and extends downwardly from the race and within the height of the handgrip. Away from the handgrip, the curve turns upward slightly and joins to the rear ramp 37d. The rear ramp is generally parallel and spaced below the bottom track 37a. To aid in guiding and capturing a pin for closing the cover upon the flipper assembly, the rear ramp extends beyond the fourth subsection 34 and beneath the third subsection 33c of the rear track.

Briefly during usage, the left side urges the pin upwardly upon moving forward from the rear 5c upon a pull of the handgrip 6. The cover opens, as later shown, and the pin travels upon the flat track 32 beyond the paddle switch 31. The cover then has the tray open for loading of a beverage packet when the tray is pulled partially out of the machine. When pulled out, the pin is generally above the stop 36. Once loaded, the tray is pushed into the machine. The initial rearward movement tilts the cover forward so that the pin engages the inside of the stop 36 and drops upon the bottom track 37a. If the user pulls the tray back out, the forward loop prevents a closed flipper assembly from reopening as it secures the pin downwardly. If the user pushes the tray in with the cover still open, the paddle switch abutting the fourth subsection 34 prevents further inward movement until the user urges the cover downward for closing. As the tray retracts into the machine, the front track and its various sections urge the pin to close the cover upon the flipper assembly. And passing between the lower end of the fourth subsection and the end of the rear ramp, the pin seals the cover upon the flipper assembly for brewing when the tray is pushed fully rearward.

Figure 9:
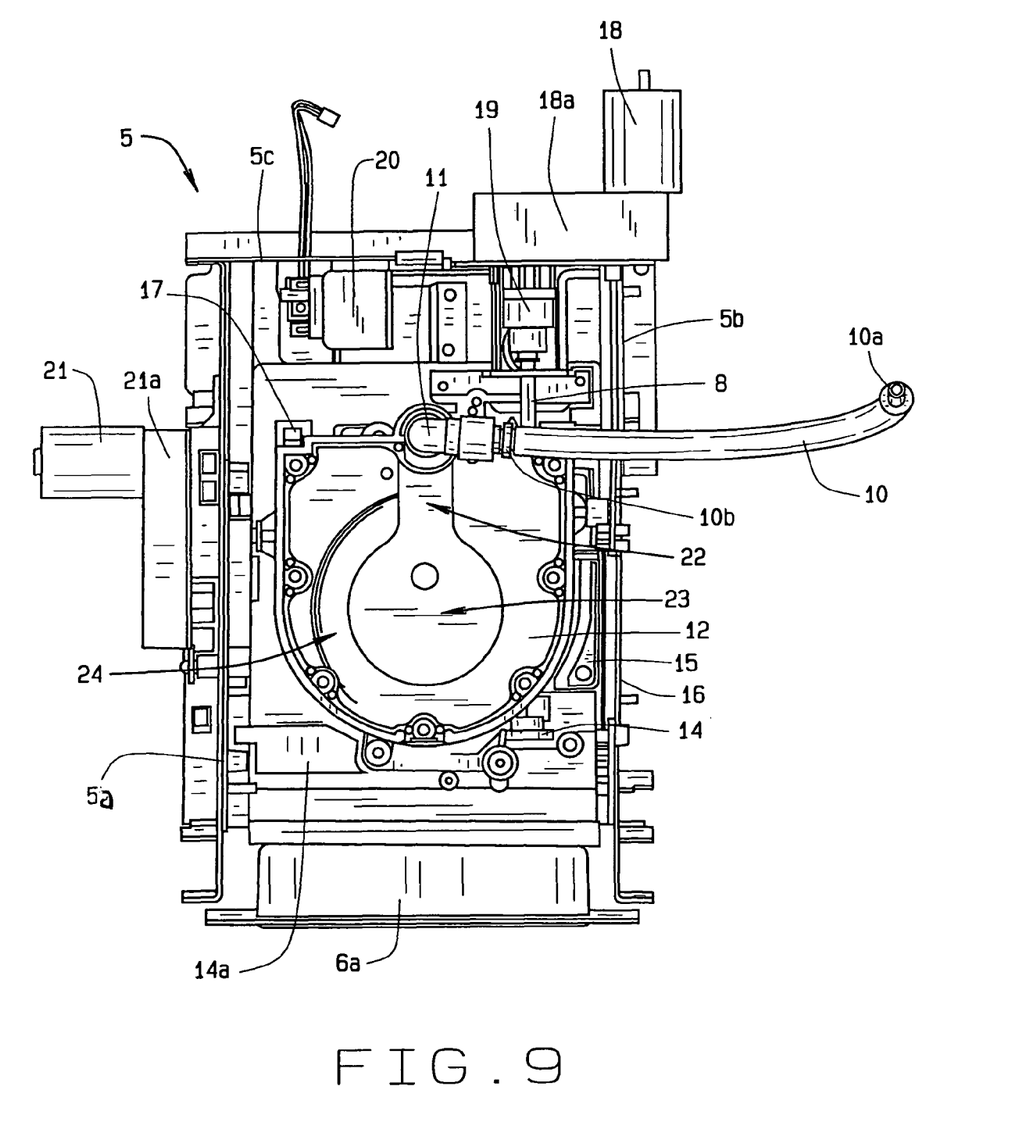
FIG. 9 is a top view of the brewing machine with the tray and related components rearwardly in the machine, generally in the home position.

Turning to a top view of the invention, FIG. 9 shows the invention following placement of a packet of beverage grounds within the flipper assembly. In this position, the invention has the faceplate 5d pushed adjacent to the front face of the machine using the handgrip 6, positioned as at 6a. In this position, the invention has the cover automatically closed upon the flipper assembly. As later shown, the invention allows for gripping the handgrip to extend the tray and related parts outwardly from the machine which raises and lowers the cover for loading and brewing of a beverage packet, and from time to time servicing of the machine. More particularly, FIG. 9 shows the inflow line 10 supplying hot water, heated water, steam, compressed air, or other fluid into the cover for brewing of a beverage packet. The planar cover has the rear edge 12a generally parallel to the rear of the vending machine, two sides 12b generally parallel to the sides of the vending machine, and the curved front edge 12c extending from the ends of the sides towards the handgrip 6a, or the front of the vending machine, in an arcuate shaped, preferably semicircular. The cover has a passageway 22 extending from the vicinity of the elbow 11 towards the center of the cover. The passageway has approximately the same width as the elbow and curves upwardly from the plane of the cover. The passageway leads into a chamber 23, generally round, that has a diameter greater than the width of the passageway. The chamber has a size proportional to the size of a brew packet. The chamber has a diameter less than the radius of the front edge 12c and occupies the center of the cover. The chamber extends upwardly from the plane of the cover generally to the same elevation as the passageway. Outwardly from the chamber, the cover has a partial annulus, as at 24, that extends from near the passageway 22, curving around the chamber towards the front edge, and merging into the cover approximately forty five degrees in rotation before the center of the front edge. The partial annulus extends around the chamber opposite the side 5b leading to the window 16.

As described above, the cover rotates about two perpendicular axes to load a beverage packet and then to unload the packet. This figure shows an alternate second motor 21 with an axis of rotation parallel to the rear edge 12a and generally close to the rear edge itself. Alternatively, the second motor provides the rotation and torque for extending and retracting the tray and related components mechanically in lieu of the handgrip 6a. In the preferred embodiment, the magnetic sensor 20 detects when the tray and related components have seated inwardly within the machine, generally in the home position. In this position, the cover has closed upon the flipper assembly and brewing may commence.

Figure 9A:
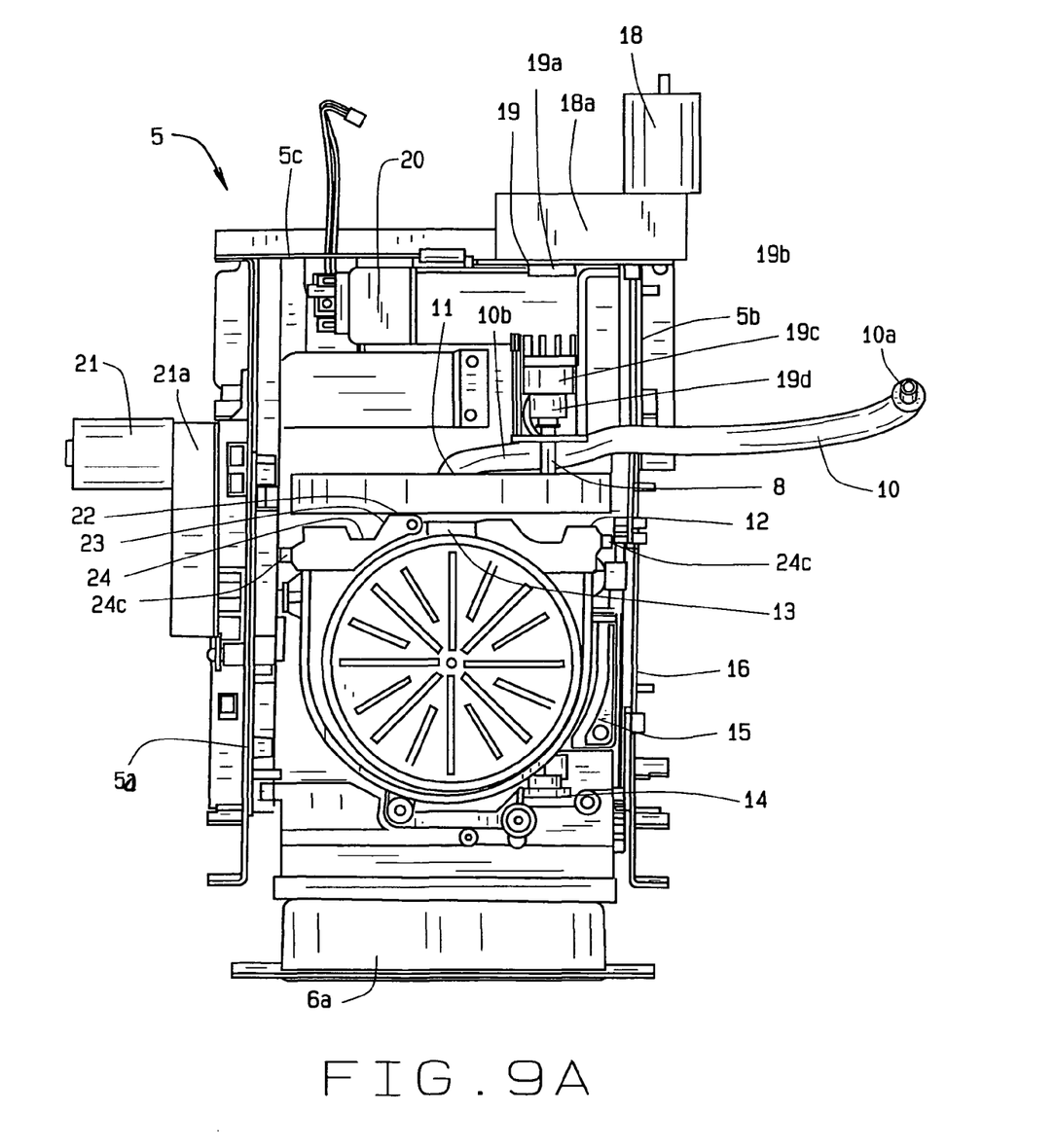
FIG. 9A is a second top view of the brewing machine but with the cover raised upwardly exposing the flipper below.

With the cover fully opened, FIG. 9a shows a top view of the tray, or moveable support, when pulled forward. In this view, the planar latch release 14a has retracted and the pin 24c has traveled upon the rear track, as at 33, so that the cover has opened showing front edge 12c. Behind the front edge, the cover has the annulus 24 with the chamber 23 inside the annulus being supplied through the central passageway 22. The passageway communicates with the inflow line 10 as previously described. With the cover upwardly, the flipper shows its pattern of drain lines that guide brewed beverage from across the flipper to a central drip aperture for dispensing into a cup or mug. This figure also shows the coupling 19 where the splines 19a have pulled out from the receptacle 19a when the tray is pulled forward by the handgrip 6 during loading of a beverage packet. The receptacle extends from the gearing 18a and has a partially conic depression axially centered. The partially conic depression has a plurality of spaced apart flutes that receive the splines 19b extending from a plate 19c upon the shaft end 19d. The splines are elongated, spaced apart finger like members, that extend axially from the shaft 8, here shown on a common base, as at 19c, engaged into the receptacle 19a. The common base is generally round with the splines generally arranged in a circle. The splines point towards the rear of the machine ready to engage the receptacle when the tray is pushed inwardly.

Figure 9B:
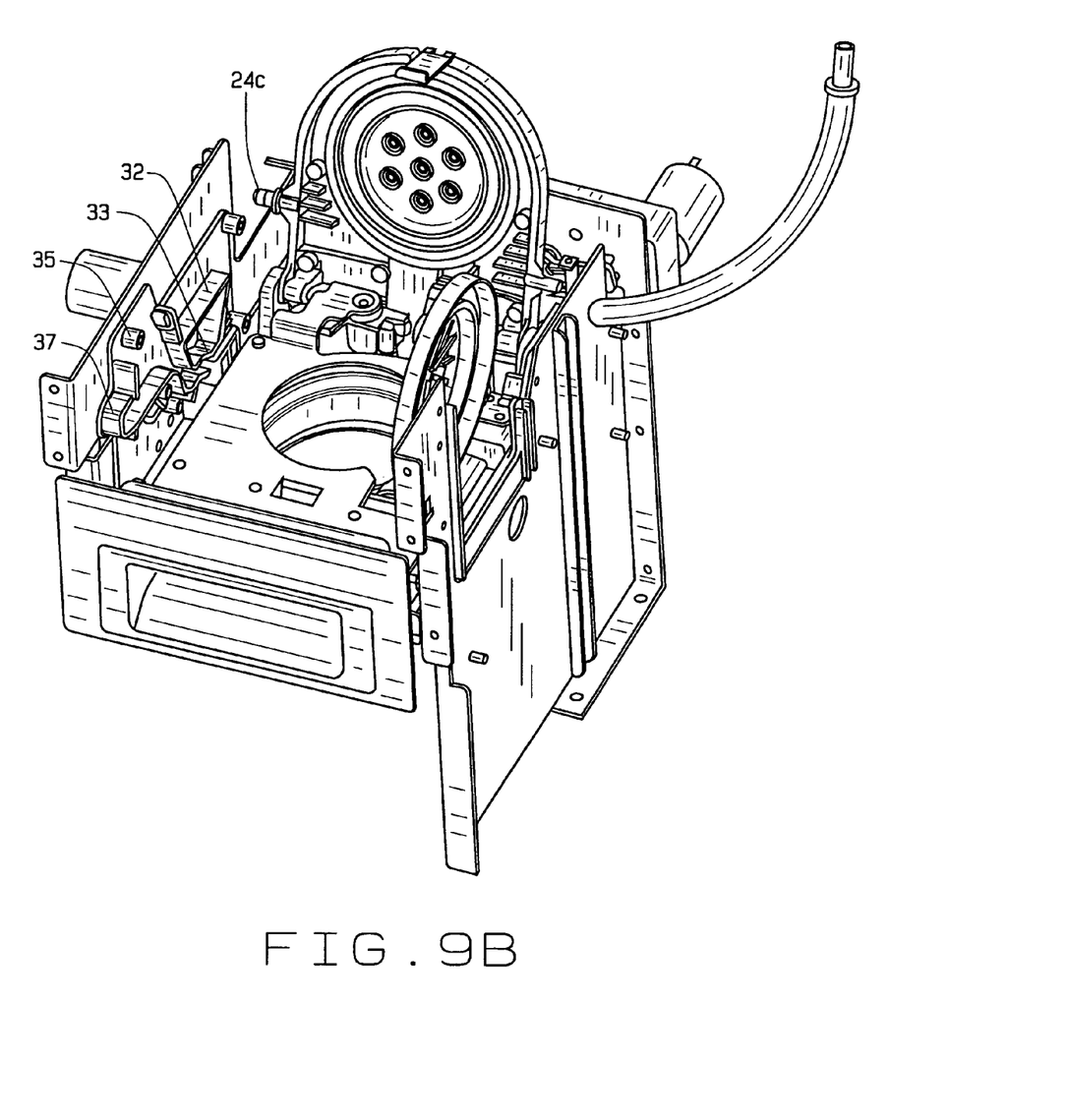
FIG. 9B is an isometric view of the brewing machine showing the cover open and the flipper assembly rotated towards the window.

After pushing in the tray and following brewing, the machine has a spent beverage packet in the flipper assembly. FIG. 9b shows the invention following ejection of a spent beverage packet with the flipper assembly upward and to the right and the cover opened and towards the rear. The invention reaches this state through the operation of various mechanisms. Opposite the coupling, the shaft 8 from the first motor 18 has a miter gear 8a and then a torsion spring 8c that compresses in a plane parallel to the face plate. Before the miter gear 8a, the shaft 8 crosses a further shaft 9 generally perpendicularly. The further shaft extends parallel to the face plate and has a lift cam 9a locating proximate the shaft 8. Outwardly from the left cam, another miter gear 9b connects to the further shaft. The two miter gears, 8a, 9b, mesh and transfer rotational power through ninety degrees from the shaft 8 into the further shaft 9. To eject the spent packet, the invention turns the shaft 8 which rotates miter gear 8a into miter gear 9b which turns the further shaft and the lifting cam. The lifting cam then engages the hinge 17 upon the cover and rotates the cover upwardly within the cabinet of the machine. As the shaft turns, the shaft rotates a spring enclosure 8b that envelopes the torsion spring 8c, as later shown in FIG. 10. Once the torsion spring attains sufficient rotation, approximately ninety degrees, the free floating shaft 8 turns the flipper support 26 abruptly thus, ejecting the spent beverage packet as the flipper 25 rotates through ninety degrees towards the right of the invention. The flipper ejects the spent packet through the window, as at 16, for collection and disposal.

Figure 9C:
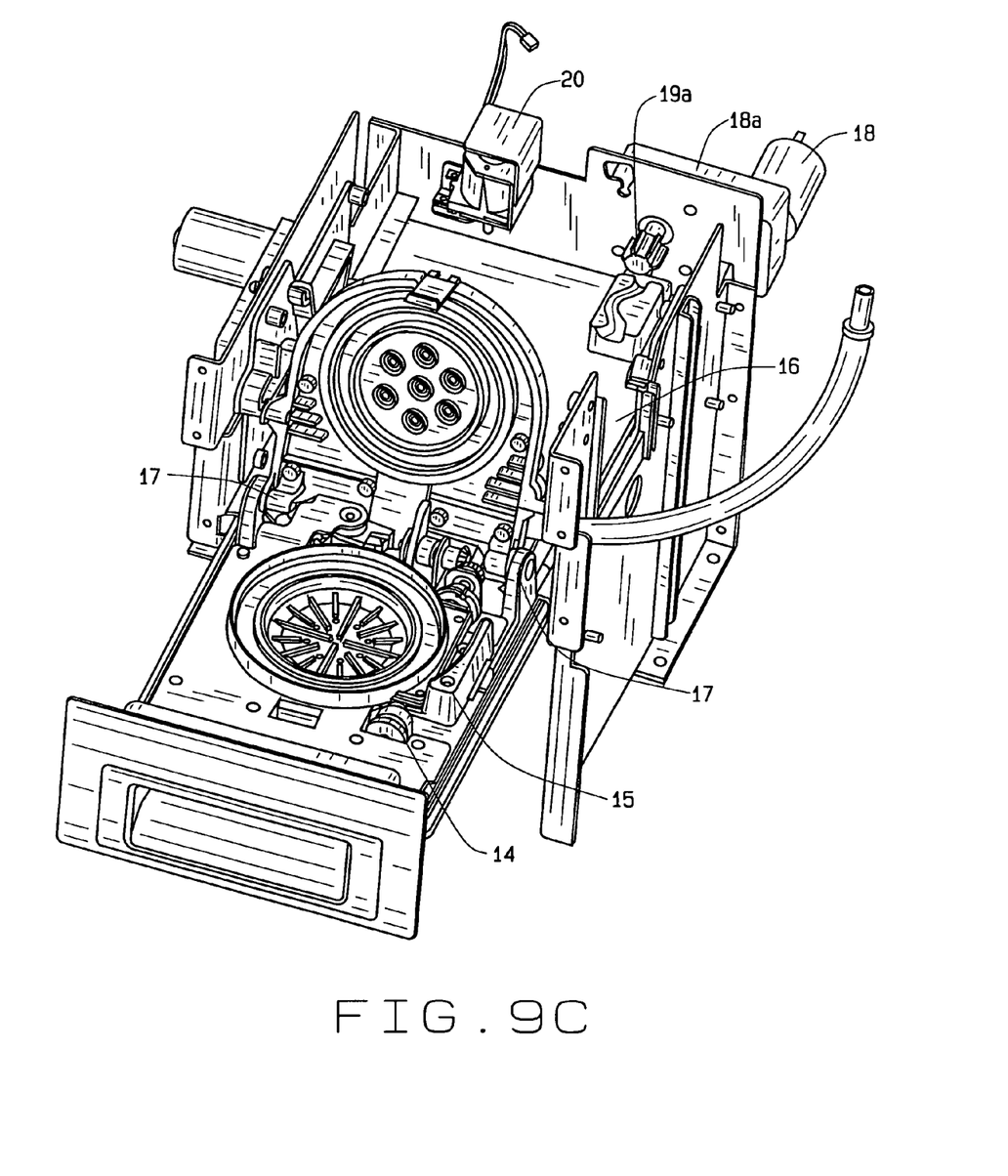
FIG. 9C then shows the tray and related components of the brewing machine extended forwardly of the machine with the cover open to receive a new packet of beverage grounds.

Following ejection of the spent packet, the machine readies itself for the next customer. The machine returns the flipper downwardly towards the tray and then indicates to the control panel that it is ready. A customer then pulls the tray forward using the handgrip 6 so that the flipper is shown and the opened cover is just behind the front panel of the machine's cabinet as in FIG. 9c. In this position, the flipper can be loaded with a beverage packet. Additionally, the tray and related components and mechanisms may be serviced by technicians in this position. Additionally, this figure further shows the enmeshed miter gears that both operate the cover and the flipper.

Figure 10:
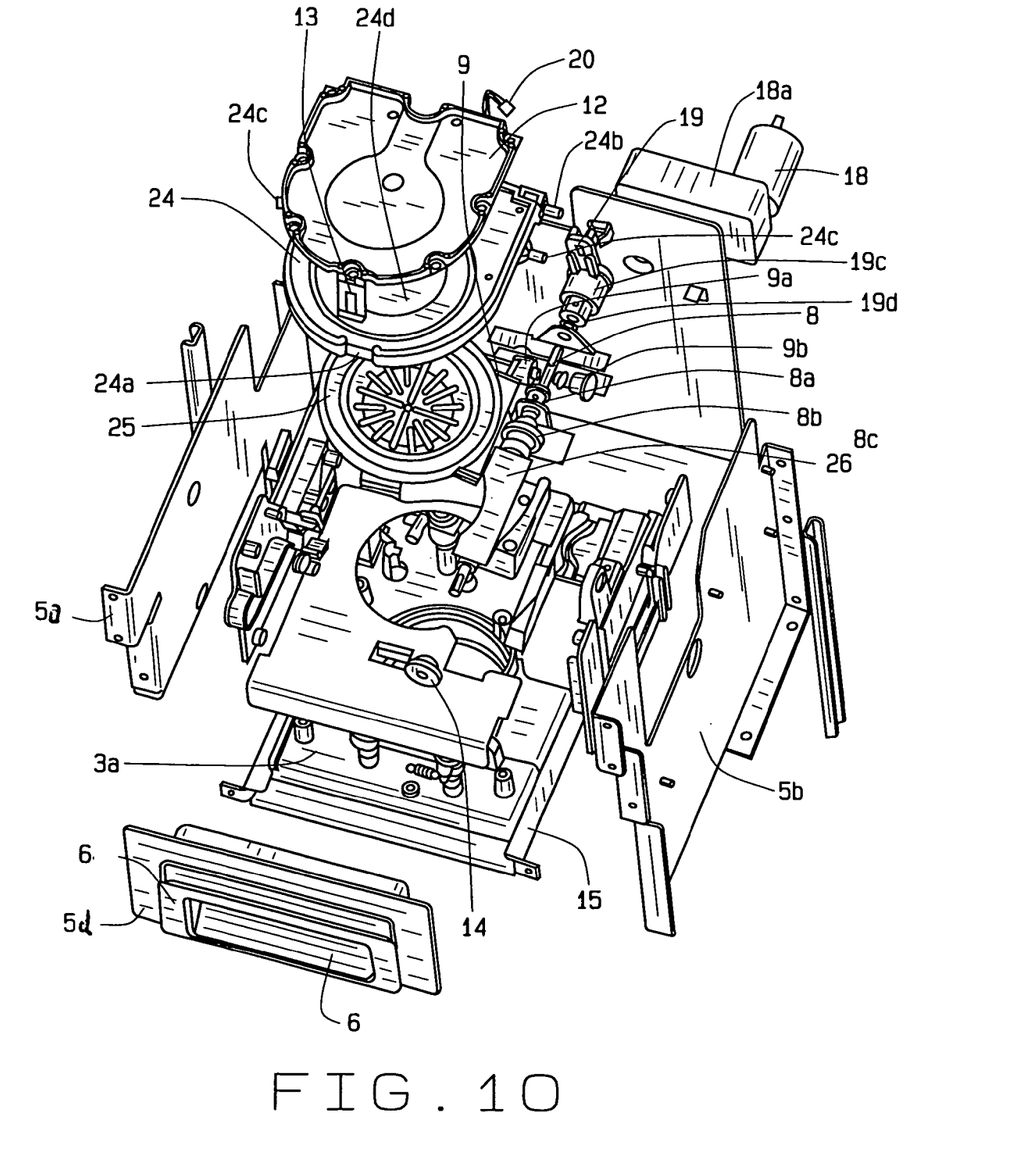
FIG. 10 is an exploded view of the brewing machine.

The components of the present invention and their positioning are further illustrated in an exploded view of FIG. 10. The present invention has a face plate 5a or gate 7, generally rectangular, that a user sees upon facing the machine. The face plate provides a support 6 that extends outwardly from approximately the center. The support also provides a handle 6a that extends from the perimeter of the support. The face plate has two parallel and spaced apart longitudinal sides generally parallel to the length of the machine and two parallel and spaced apart later ends perpendicular to the sides. Connecting to the sides of the face plate, the present invention has two sides 5b of a casing as previously described. These sides 5b are also mutually parallel but perpendicular to the face plate. The working components of the invention fit between these sides 5b. Opposite the face plate, the rear 5c completes the enclosure of the invention shown in this view. The rear provides an attachment location for the first motor 18.

The first motor 18 connects through gearing into a drive coupling 19. The coupling receives the rotation and torque stepped by the gearing. The coupling then transmits the rotational power to the shaft 8 that extends parallel to the sides 5b of the casing. During operations of the present invention, the first motor, related gearing 18a, and magnetic sensor 20 remain in place though the tray and related components may move outwardly and inwardly from the machine. The coupling further has two coaxial components, a receptacle 19a and a shaft end 19d. The receptacle extends from the gearing and has a partially conic depression axially centered. The partially conic depression has a plurality of spaced apart flutes that receive the splines 19b extending from a plate 19c upon the shaft end 19d. The splines are elongated, finger like members, that extend axially from the shaft 8, here shown on a common base, as at 19c, and that are engaged into the receptacle 19a.

Opposite the coupling, the shaft 8 from the first motor 18 has a miter gear 8a and then a torsion spring 8c that compresses in a plane parallel to the face plate. Before the miter gear 8a, the shaft 8 crosses a further shaft 9 generally perpendicularly. The further shaft extends parallel to the face plate and has a lift cam 9a locating proximate the shaft 8. Outwardly from the left cam, another miter gear 9b connects to the further shaft. The two miter gears, 8a, 9b, mesh and transfer rotational power through ninety degrees from the shaft 8 into the further shaft 9. To eject the spent packet, the invention turns the shaft 8 which rotates miter gear 8a into miter gear 9b which turns the further shaft and the lifting cam. The lifting cam then engages the hinge 17 upon the cover and rotates the cover upwardly within the cabinet of the machine. As the shaft turns, the shaft rotates a spring enclosure 8b that envelopes the torsion spring 8c. In the home position with the tray, related components, and splines seated rearwardly in the invention, the torsion spring has its two ends generally aligned. The torsion spring, though coaxial with the shaft, turns independently of the shaft. The shaft rotates for approximately four revolutions thus turning the spring enclosure which imparts tension to the torsion spring. Once the torsion spring attains sufficient rotation, approximately ninety degrees of separation between the ends of the torsion spring, the free floating shaft 8 abruptly turns the flipper support 26 thus, ejecting the spent beverage packet as the flipper 25 rotates through ninety degrees towards the window 16 through which passes the spent packet for collection and disposal.

Moving along the axis of the shaft 8, the invention has a flipper support 26 of a generally elongated rectangular form. The flipper support has a length at least that of the shaft 8 and a width proportionate to the diameter of the torsion spring 8c. Upon one longitudinal edge, the flipper support has a counterweight 15 that extends outwardly from the flipper support in the direction of the window 16. The counterweight extends upwardly from the flipper support and has a partially concave shape that accommodates the cover 12. Opposite the counterweight, the flipper support has a concave longitudinal edge. This concave longitudinal edge has two ends with one end locating towards the faceplate, proximate the locking cam 14, and the opposite end locating towards the torsion spring 8c. At this end towards the torsion spring, the flipper assembly 25 joins to the flipper support. The flipper assembly is generally round with a raised lip upon the circumference and a tab locating tangent to the assembly. The tab provides a rectilinear edge for joining to the flipper support. Within the lip, the flipper assembly has a slight depression that includes perpendicular major drain lines and a plurality of radial drain lines.

Locating above the flipper assembly, an inner cover 24 rests upon the flipper assembly 25. The inner cover has a similar shape as the lid or cover 12 with a straight edge, two mutually parallel and spaced apart sides perpendicular to the straight edge, and a curved front edge opposite the straight edge. The inner cover has a notch 24a. Opposite the notch, the straight edge has two pins 24b locating at each end of the straight edge and generally being coaxial with the length of the straight edge and parallel to the diameter of the curved front edge. The pins allow the inner cover to pivot upon the action of the shaft 9 as previously described. Inwardly from the hinge pins 24b along the sides, the inner cover has at least one guide pin 24c generally parallel to the other pins as at 24b. Within the sides, straight edge, and curved front, the inner cover has a partially concave dome like center portion, as at 24d. The center portion distributes the heated water, hot water, compressed air, or steam from the chamber 23 evenly throughout itself. The center portion also has a plurality of small pores for admission of water in various states into a beverage packet placed upon the flipper assembly 25 beneath the inner cover 24. Above the inner cover, the machine has the lid or cover 12 functioning as an outer cover. The cover 12 generally attaches to the inner cover within the perimeter formed by the straight edge, sides, and front edge of the inner cover. The cover 12 has the chamber 23 and passageway 22 as previously described. During usage the cam 14 locks the cover and assembly closed as when the inflow line 10 supplies fluid during brewing and compressed air after brewing, and then unlocks the cover for lifting upwards to eject a spent beverage package and to receive a new beverage brewing packet. The tray 3a has a generally planar form locating generally below and around the flipper assembly 25. The tray includes a partially circular aperture for the bottom of the flipper assembly and an adjoining rectangular aperture for admitting the flipper support 26 and the counterweight as both rotate about an axis parallel to the plane of the tray. Forward of the flipper assembly, the tray connects to the faceplate 5a, with its handgrip 6, for insertion of beverage packets for brewing using the present invention.

Figure 11:
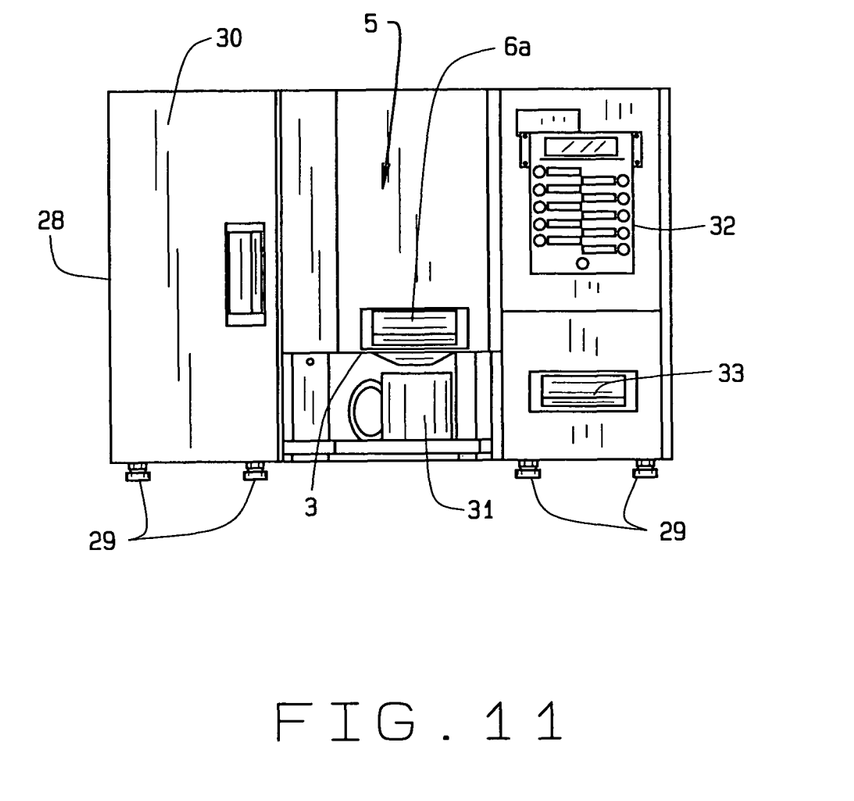
FIG. 11 shows a front view of the brewing machine incorporated into a cabinet and ready for the tray assembly for brewing a selected cup of coffee; and, FIG. 12 provides a circuit diagram for the brewing machine of the present invention.

Then in FIG. 11, the present invention is shown installed within a cabinet 28 that has a generally rectangular form. This view shows the front of the cabinet as a user would operate the machine. Beneath the cabinet, a plurality of feet 29 support the invention and its surrounding equipment. The feet locate beneath the corners of the cabinet and at other strategic locations, such as beneath water tanks and other heavy components. Towards the left of this figure, the cabinet has an access door 30 that allows a user to retrieve items from behind it. The access door occupies approximately one third of the length of the cabinet. In the center third of the cabinet, the present invention stands ready to brew a cup of beverage for a user. The present invention, as at 5, remains inside the cabinet inside its casing as at 5a. The tray extends outwardly from the cabinet and indicates to the user the insertion point of the beverage brew packet. A user places a mug, as at 31, beneath the drawer, moreover beneath the tray as at 3, to receive a beverage as brewed by the invention. The mug shown here upon a drip tray remains stationary through the brewing process. To the right of the present invention and opposite the access door within the cabinet, the machine has a control panel 32 on the brewer, upon which the user or purchaser can exercise control over the process of selection of the type of beverage, the amount of cream or other condiments to be applied therein, during the brewing cycle, and the cycle of operation for the brewing action in providing an individual cup of beverage. The control panel also has integrated into its structure a computer or other integrated circuit means, including software, that regulates all of the various functions of the operation of this device, and the brewer in which it installs. The computer allows the purchaser to make multiple selections on the type of beverage, and condiments, that need to be brewed into the individual cup of beverage, for consumption. The computer also regulates the working of the components of the present invention and provides an interface for maintenance and repair of the invention. Workers can access the computer and perform diagnostic functions upon the components and sequence of the invention and brewing steps. The control panel and the computer provide for remote access of the brewing machine using a modem or device connected to a communications network, including land line, Ethernet, and wireless internet. Beneath the control panel, the machine has a delivery slot 33 that provides beverage packets for the user or purchaser to place into the tray 3 through the drawer 6 for brewing. The control panel allows the user to select the beverage grounds and flavorings as desired resulting in a freshly brewed single serving of a beverage with minimal brewing preparation by the user.

Figure 12:
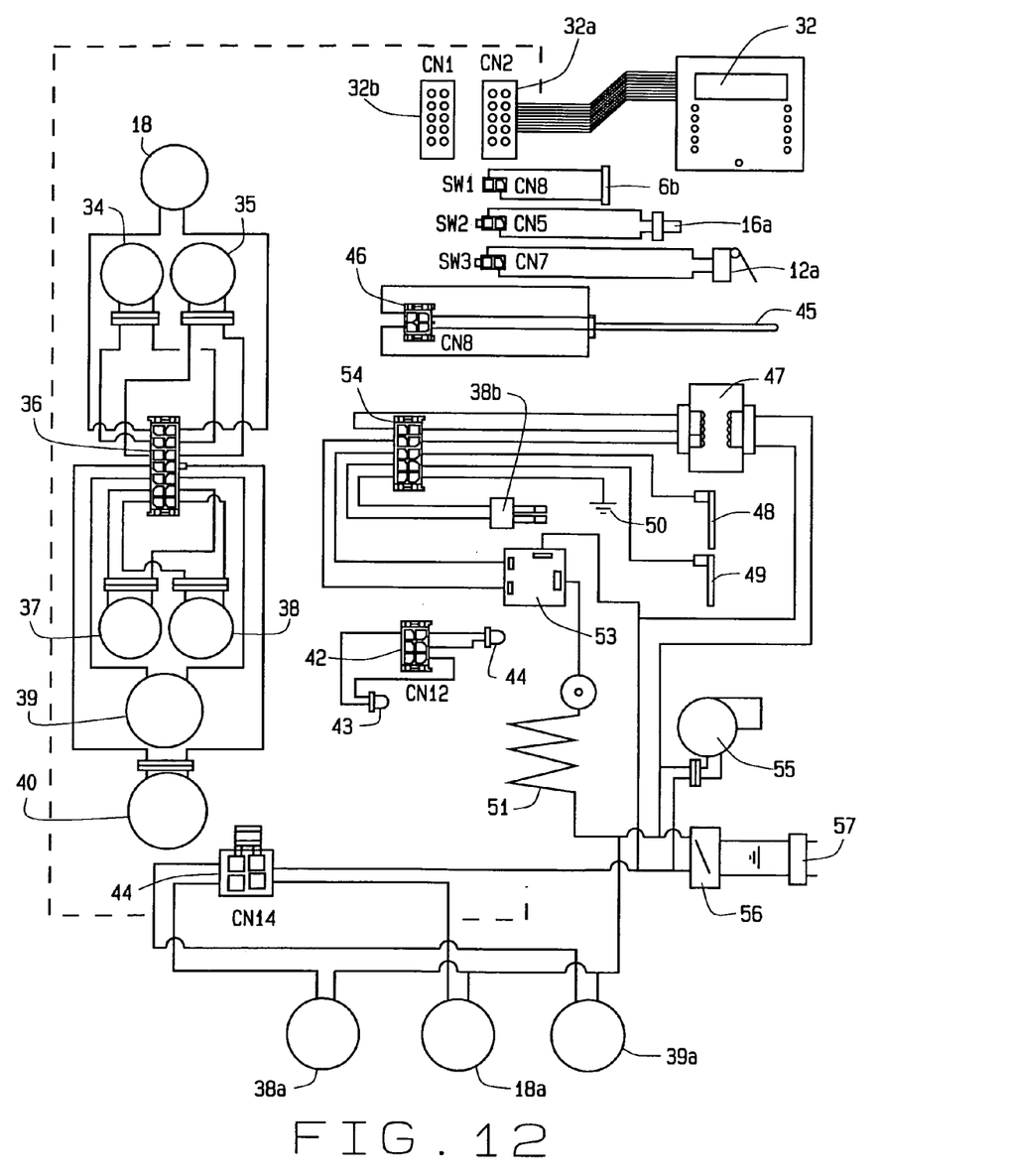

And then in FIG. 12, a circuit diagram illustrates the relationships between various components of the present invention and auxiliary devices. Beginning towards the top of the figure and proceeding counterclockwise, the invention has circuitry for the display board 32 that provides information to the user for selection of coffees and operational steps of the machine. The display board connects to its circuit as at 32a and an accessory panel as at 32b. Proximate the display board on the diagram, the machine has a pod driver switch as at 6b that moves the tray carrying the holder, a waste driver position switch as at 16a that directs flipping of the tray to eject a spent beverage packet, and a pod cover switch as at 12a that regulates the opening and closing of the lid 12. The diagram then connects with the first motor 18 that flips the tray. Proximate the first motor on the diagram, a left hand auger motor as at 34 and a right hand auger motor as at 35 connect through a processor as at 36. The processor directs the auger motors to advance and retract the tray, as at 6, during operations of the machine. Alternatively, the auger motors move various coffee components for making a blend to order of the user. The processor 36 also directs a powder pump as at 37 and a water pump as at 38. An additional air pump 39 provides air when needed for various coffee recipes, such as latte and espresso. With air, powder, and water supplied through pumps, the processor 36 then directs a whipper motor 40 to run that whips those ingredients into a frothy beverage. The first motor, auger motors, powder pump, and water pump operate upon twelve volt DC current. Then the air pump and whipper motor use twenty four volt DC current in their operations.

The pumps described above operate under regulation from the switch as at 41. This switch has subparts that regulate operation of the first motor through a pod run solenoid as at 18a, of the air pump through a pod air solenoid 39a, and of the water pump thorough the tank fill solenoid 38a. From the machine, light emitting diodes, as at 43, 44, communicate the status of operations and of a beverage to a user through switch 42. In the preferred embodiment, the machine operates upon electricity stepped down in voltage through a transformer as at 47. The transformer accepts power from utility service as at 57 once the switch 56 is closed. Closing the switch also supplies power to a blower motor 55 that operates upon one hundred ten volts AC current. Returning to the transformer, the transformer delivers stepped down power to a processor at 54. This processor connects to various sensors that also regulate operations of the machine. Liquid level probes at 48, 49 indicate the water level in two tanks adjacent to the machine as known in the prior art for supplying heated and cool water. An overflow probe as at 38b then indicates to the processor 54 when water level in the cup or mug as at 31 exceeds that of a single serving. The processor also connects with the ground as at 50 that protects the circuitry of the machine. And the processor connects with a heater relay as at 54 that regulates operations of a heater 51 that heats water in an adjacent tank as known in the prior art. The tank heater also has specific protection through a high limit valve as at 52 that disables the heater when it draws excessive amounts of current.

The automatic single cup brewing vender and its various components may be manufactured from many materials, including but not limited to, polymers, high density polyethylene, polypropylene, ferrous and non-ferrous metals, their alloys, and composites.

Variations or modifications to the subject matter of this invention may occur to those skilled in the art upon review of the summary as provided herein, and upon undertaking a study of the description of its preferred embodiment. The invention as described herein, and as disclosed in the drawings, is set forth for illustrative purposes only.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

We claim:

1. A device for automatically brewing and vending a single serving of a dispensed beverage comprising:

a flipper assembly receiving a packet of beverage grounds;

a dispenser including a moveable support, said support shifting between the exterior of said device wherein said flipper assembly prepares for brewing, and the interior of said device for inserting said flipper assembly therein for drip brewing of a single serving of beverage;

at least one line delivering fluids within said dispenser to said flipper assembly;

an automatic means providing for the sequence of operations for said flipper assembly and said moveable support through various operations of said dispenser in brewing an individual cup of a beverage; and, said sequence of operations including receiving said beverage grounds packet into said flipper assembly, closing said flipper assembly, inserting said flipper assembly within said dispenser, brewing and dispensing the beverage, opening said flipper assembly within said dispenser, ejecting said beverage grounds when spent from said flipper assembly and said dispenser, and preparing said flipper assembly for its next use;

said flipper assembly having a tray, a lid hingedly connecting to said flipper assembly towards one end interiorly of said device and rotating about an axis perpendicular to the direction of travel of said moveably support, said tray hingedly connecting to said flipper assembly generally perpendicular to said lid wherein said tray opens upwardly to one side of said flipper assembly;

said flipper assembly having a flipper support rotating about an axis parallel to the direction of travel of said moveably support, said flipper support directing said tray to eject said beverage grounds when spent, a counterweight contiguous with said flipper support though locating opposite and outwardly from said flipper support, an inner cover locating upwardly upon said flipper support and generally sealing said holder within said flipper support as during brewing;

said lid having a similar shape as said inner cover and providing a vapor tight seal with said inner cover;

a window adjacent to said flipper assembly outward from said counterweight, said window receiving said packet of beverage grounds when spent for disposal outside of said device;

said movable support having a handgrip, generally upon the front of said moveable support;

said inner cover having a curved front edge, an opposite generally straight rear edge, and two mutually parallel sides perpendicular to said rear edge, at least one pin on at least one of said sides, said at least one pin extending perpendicular to said side;

said inner cover having a concave dome like shape extending upwardly from said moveable support and said inner cover having at least one aperture therethrough; and a casing having a left side generally towards the center of said device, an opposite right side allowing for ejecting of said packet of beverage grounds when spent, a rear spanning between said left side and said right side, and a face plate opposite said rear generally locating towards the front of said device.

2. The single serving automatic brewing device of claim 1 further comprising:

said lid having a curved front edge, an opposite generally straight rear edge, and two mutually parallel sides perpendicular to said rear edge, said lid hingedly connecting to said inner cover upon said rear edge, said lid having a chamber, generally of a concave dome like shape extending upwardly from said inner cover and a passageway extending radially from said chamber towards said rear edge, said chamber defining an annulus; and, said line supplying fluids to said chamber, wherein said lid delivers fluids to said inner cover for brewing of a beverage.

3. The single serving automatic brewing device of claim 1 further comprising:

said left side having an interior face, generally upon the interior of said device, said interior face having at least one track extending perpendicularly therefrom, said at least one track guiding said at least one pin upon said inner cover through opening and closing during the various operations of said device during a brew cycle; and, said right side having said window.

4. The single serving automatic brewing device of claim 3 further comprising:

said left side having a rear track, said rear track including a pivot, a paddle switch, a flat section rearward of said paddle switch, a first subsection below said flat section, a second subsection extending from said first subsection, a third subsection extending from said second subsection, and a fourth subsection extending upwardly from said third subsection and returning to said paddle switch; and, said left side having a front track generally more towards said handgrip than said rear track, said front track including a knob, a nearly vertical stop forward of said knob, a forward loop extending from said stop, a bottom track extending from said forward loop, a nearly vertical race depending from said bottom track, a curved section depending from said race, and a rear ramp extending from said curved section and locating generally below said fourth subsection of said rear track;

wherein said at least one pin travels upon said left side, said rear track, and said front track during said sequence of operations.

5. The single serving automatic brewing device of claim 1 further comprising:

said movable support having a generally planar shape and said flipper assembly resting within said movable support.

6. The single serving automatic brewing device of claim 1 further comprising:

said automatic means having a first motor, a drive coupling connecting to said first motor, and a first shaft extending from said drive coupling using splines, said first shaft extending along said device generally parallel to the direction of travel of said moveable support, said first shaft providing rotation and torque for locking and unlocking said dispenser and for ejecting said packet of beverage grounds when spent; and, a control panel operating said first motor through said sequence of operations.

7. The single serving automatic brewing device of claim 1 further comprising:

said line supplying fluids, air, or gases to said inner cover; and, said inner cover having a passageway in communication with said line and a chamber extending from said passageway, said chamber dispersing fluids and gases within said flipper assembly during said sequence of operations.

8. The single serving automatic brewing device of claim 6 further comprising:

said first shaft having at least one miter gear outwardly from said coupling and at least one biasing means outwardly of said miter gear;

a second shaft generally perpendicular to said first shaft, having at least one miter gear generally perpendicular to said at least one miter gear upon said first shaft and at least one lifting cam interiorly of said at least one miter gear, said lifting cam opening and closing said flipper assembly; and, said biasing means engaging said flipper assembly, said biasing means storing rotational energy until released when ejecting said beverage grounds when spent out of said dispenser.

9. The single serving automatic brewing device of claim 8 further comprising:

said biasing means including a spring enclosure connecting to said first shaft and a torsion spring connecting to said flipper assembly, said spring enclosure imparting rotation through said torsion spring and into said flipper assembly for ejecting said beverage packet when spent.

10. The single serving automatic brewing device of claim 8 further comprising:

said control panel activating said device upon a user supplying funds or pressing a button, directing said device through extending said movable support, retracing said movable support into said device, closing said flipper assembly upon said packet of beverage grounds, supplying fluids or gases to said dispenser for brewing said beverage, opening said flipper assembly following brewing, ejecting said packet of beverage grounds when spent, cleaning said flipper assembly, and preparing said device for the next user thereof.

11. The single serving automatic brewing device of claim 8 further comprising:

a second motor locating upon a side of said device;

related gearing connecting to said second motor; and, a drive shaft extending from said gearing along said moveable support, said drive shaft providing rotation and torque for extending and retracting said moveable support from said device during the various brewing steps.

12. The single serving automatic brewing device of claim 6 further comprising:

at least one locking cam upon said flipper assembly coaxial with said first shaft, said at least one locking cam rotating to lock and unlock said inner cover during said sequence of operations; and, said flipper assembly including a counterweight spaced apart from the axis of said first shaft and generally proximate said window.

13. A device for automatically brewing and vending a single serving of a dispensed beverage including:

a flipper assembly for holding an individual packet of beverage grounds;

a dispenser including a moveable support, capable of shifting between an exterior condition wherein said flipper assembly prepares said packet for brewing; and an interior condition for inserting said flipper assembly within said device for drip brewing of a single serving of beverage;

an automatic means providing for the sequence of operations for said flipper assembly, and the various operations of said flipper assembly, in having a single serving of a beverage brewed, said sequence of operations including receiving payment or a command to start said sequence, of operations, receiving said beverage grounds packet into said flipper assembly, closing said flipper assembly, inserting said flipper assembly into said dispenser, brewing and dispensing the beverage, opening said flipper assembly;

providing a window laterally adjacent to said flipper assembly and providing for ejecting said beverage grounds therethrough when spent out of said dispenser, cleaning said flipper assembly, and directing said flipper assembly outwardly of said dispenser.

14. An automatic single serving brewing vender comprising:

a machine for use for brewing dispensed beverages;

said machine including a holder, useful for holding an individual packet of, beverage grounds, a dispenser including a moveable support, capable of shifting between its condition usually where said holder can be applied in preparation for brewing, and its condition for inserting said holder within said vender for drip brewing of an individual serving of a beverage, and an automatic means providing for the sequence of operations for said holder and said machine;

said holder including a handle, said handle having a base, a tray hingedly connecting to said base generally parallel to said handle, an upper half over said tray, said upper half opening perpendicular to said handle to provide for the locating of a packet of beverage grounds therein upon said base before closing said upper half, and said tray flipping outwardly when said upper half is open and ejecting said packet of beverage grounds when spent from said vender.

\* \* \* \* \*